United States Patent Office 3,097,062
Patented July 9, 1963

3,097,062
PROCESS FOR THE PREPARATION OF GRANULAR URANIFEROUS MATERIAL OF UNIFORM PARTICLE SIZE
Marie E. A. Hermans and Theo van der Plas, Arnhem, Netherlands, assignors to Stichting Reactor Centrum Nederland
No Drawing. Filed May 14, 1959, Ser. No. 813,053
Claims priority, application Netherlands May 14, 1958
3 Claims. (Cl. 23—14.5)

This invention relates to a process for the preparation of granular uraniferous material of uniform particle size.

For the purpose of preparing fissile material and/or fertile material for nuclear reactors, especially for such reactors in which use is made of a suspension or slurry of granular fissile material in a carrier liquid, it is of advantage to have a method which makes it possible to directly obtain uraniferous material of uniform particle size, without requiring that the chemical or physical preparation be followed by complicated grinding, separating or classifying processes. It is also of advantage if important properties of the material, such as roundness and strength, are to be obtained in a reproducible manner.

In a known process of the kind referred to a seed-free, hot, aqueous solution, containing about 0.4 gram ions of uranyl ions per liter and furthermore nitrate ions and urea, is homogeneously stirred. After termination of the homogeneous precipitation thus brought about, the solid substance is rapidly separated from the hot liquid.

In this process, the urea acts as an ammonia donor, that is a substance which evolves ammonia so slowly under the prevailing process conditions that a precipitate will not be formed before completion of a perfect homogenization of the solution.

According to our experiments, the granular material obtained with the said known method does not come up to stringent requirements especially as regards uniformity of the particle size. The material shows a characteristic particle size distribution having one or more broad maxima.

The main object of the invention is to provide an improved process of the kind specified yielding granular uraniferous material of a very uniform particle size, that is, having a particle size distribution showing one distinct and very narrow maximum.

A further object of the invention is to provide such process wherein granular uraniferous material is obtained that is very suitable as a basis for the preparation of granular uranium dioxide of very uniform particle size, to be utilized in homogeneous nuclear reactors of the slurry type.

Further objects of the invention will become apparent from the following description and appertaining claims, and from an example which will be given by way of illustration and not of limitation.

According to the invention, there is provided a process for the preparation of granular uraniferous material wherein a hot aqueous solution seed-free containing about 0.4 gram ions of uranyl ions per liter and containing furthermore nitrate ions and urea, is homogeneously stirred. After termination of the homogeneous precipitation thus brought about, the solid substance is rapidly separated from the hot liquid. The initial urea concentration is between 110 and 200 grams per liter, and the temperature of the solution during the precipitation is kept below 100° C.

Preferably, the temperature of the solution during the precipitation is kept between 90 and 98° C., and the initial concentration of the nitrate ions is below 1.8 gram ions per liter.

In this way, there is obtained a granular uraniferous material having a characteristic particle size distribution showing one single sharp maximum at one distinct particle size. Moreover, the granular material obtained according to the process of the invention consists of particles that may be defined as conglomerates of substantially amorphous primary particles. In contrast the particles of the material obtained by the known process hereinbefore referred to applying initial urea concentrations smaller than 110 grams per liter or greater than 200 grams per liter, are of a crystalline nature.

According to the invention, the initial uranyl ion concentration may deviate somewhat from 0.4 gram ions per liter, that is to say, it may be taken between 0.2 and 0.6 gram ions per liter.

The solid substance thus obtained is very suitable as a basis for the preparation of modified granular uraniferous material, for instance uranium dioxide, of likewise very uniform particle size. This may be achieved by reduction with hydrogen, followed by individual sintering in an atmosphere of water-containing hydrogen. By individual sintering is meant a sintering process in which the particles are not enlarged by adhesion. The uranium doxide thus obtained is very suitable for use in homogeneous nuclear reactors of the suspension or slurry type.

The following example, while not restricting the scope of the invention, is illustrative thereof.

*Example*

1 liter of an aqueous uranyl nitrate solution containing 0.40 gram ions of uranyl ions per liter and 1.32 gram ions per liter of nitrate ions is partly neutralized with 50 ml. of 25% ammonia. The resulting solution, rendered seed-free by filtration, is heated to 94°±2° C. and, while this temperature is maintained, 500 milliliter of a filtered aqueous urea solution is added which contains 500 g. of urea per liter. The entire solution now containing per liter 0.27 gram ions of uranyl ions and 167 grams of urea, is homogeneously stirred by means of a vibratory plate agitator. The formation of a homogeneous orange-yellow precipitate does not start until 20 to 40 minutes afterwards. The precipitation process lasts about 90 minutes. Then the solid substance is rapidly separated from the hot liquid, washed with water and dried with acetone. The particle size distribution of the non-crystalline solid substance obtained shows an extremely sharp maximum at approximately 13 microns, with a maximum standard deviation of 3 microns.

The solid substance obtained is reduced in a hydrogen atmosphere at 1,000–1,200° C. for 20 minutes and then individually sintered at a temperature of 1,700° C. in an atmosphere of hydrogen containing about 30% water vapour.

The particle size distribution of the uranium dioxide thus obtained shows an extremely sharp maximum at about 9 microns and the same characteristic particle size distribution as the product from which it was prepared and, moreover, has a very small specific surface area (0.05–0.10 m.$^2$ per gram). It lends itself excellently to be used as the fissile material in a homogeneous suspension or slurry nuclear reactor in which continuous purification takes place during operation (see the copending Went application, Serial No. 536,638).

We claim:
1. A process of preparing a uranium containing material of uniform particle size comprising adding 110 to 200 grams per liter of urea to a hot aqueous solution containing 0.2 to 0.6 gram ions of uranyl ions per liter, and an initial nitrate ion concentration less than 1.8 gram ions per liter, homogeneously stirring said mixture and rapidly separating, after termination of the homogeneous precipitation thus brought about, the solid precipitate from the liquid and maintaining the temperature of the solution during the homogeneous precipitation between 90 and 98° C.

2. A process according to claim 1 wherein the concentration of the uranyl ions is 0.4 gram ions.

3. A process comprising adding to one liter of hot aqueous uranyl nitrate solution containing 0.40 gram ions of uranyl ions and 1.32 gram ions of nitrate ions 50 ml. of 25% ammonia, filtering to remove seeds, adding 500 ml. of aqueous urea containing 500 grams of urea per liter, rapidly separating the homogeneous precipitate from the still hot liquid and maintaining the temperature of the solution during the homogeneous precipitation below 100° C.

References Cited in the file of this patent

Belle et al.: WAPD–PWR–PMM–491 Sept. 12, 1956 (date declassified June 25, 1957), pp. 7–9, 77–90.

Harrington et al.: "Chem. Eng. Progress," vol. 54, No. 3, pp. 65–69, March 1958.

AEC Document, TID–7546, Book 2, p. 446, March 1958.

Gentile: "J. Inorg. and Nuclear Chem.," vol. 10, pp. 110–113, April 1959.

TID–7546, Book 2, p. 390, March 1958.